United States Patent [19]

Mattaboni

[11] Patent Number: 5,165,064
[45] Date of Patent: Nov. 17, 1992

[54] MOBILE ROBOT GUIDANCE AND NAVIGATION SYSTEM

[75] Inventor: Paul J. Mattaboni, Medfield, Mass.

[73] Assignee: Cyberotics, Inc., Waltham, Mass.

[21] Appl. No.: 674,517

[22] Filed: Mar. 22, 1991

[51] Int. Cl.$^5$ ............................................. G06F 15/50
[52] U.S. Cl. ...................................... 356/152; 356/1;
901/1; 901/46; 901/47; 364/424.01; 364/424.07
[58] Field of Search .................... 901/1, 46, 47; 356/1,
356/152; 364/424.01, 424.07

[56] References Cited

U.S. PATENT DOCUMENTS

| | | | |
|---|---|---|---|
| 4,607,186 | 8/1986 | Takayama et al. | 310/324 |
| 4,638,445 | 1/1987 | Mattaboni | 364/424 |
| 4,710,020 | 12/1987 | Maddox et al. | 356/1 |
| 4,947,094 | 8/1990 | Dyer et al. | 364/424.01 |
| 4,986,384 | 1/1991 | Okamoto et al. | 364/424.02 |

*Primary Examiner*—Mark Hellner
*Attorney, Agent, or Firm*—Wolf, Greenfield & Sacks

[57] ABSTRACT

A mobile robot which has a guidance and navigation system (sometimes called a "vision" system) employing one or more arrays of ultrasonic transducers and, preferably, one or more infrared detectors, as well. Each of the ultrasonic transducers is arranged to monitor its own sector of the robot's workspace. Sector monitoring is facilitated by providing for each such transducer a horn fronting the transducer; at least part of the horn's surface is covered by ultrasonic energy absorptive material. According to a second aspect of the invention, the robot is used in conjunction with an infrared beacon system including one or more (preferably ceiling-mounted) beacons each of which emits a uniquely coded infrared signal. The robot is equipped with an infrared detection means affixed to the robot and arranged to allow light from the beacon to impinge on an infrared sensor only when the detector is in precise alignment with the beacon. Multiple sensors are preferably provided, each receiving light from the beacon only when that sensor is aligned with the beacon. The signal from the infrared beacon is decoded to ascertain the particular beacon the robot is near. The orientation of the robot relative to the beacon is signalled by which sensor is aligned with the beacon, which is determined by the processor examining all sensor outputs and picking the one with the largest output signal.

8 Claims, 2 Drawing Sheets

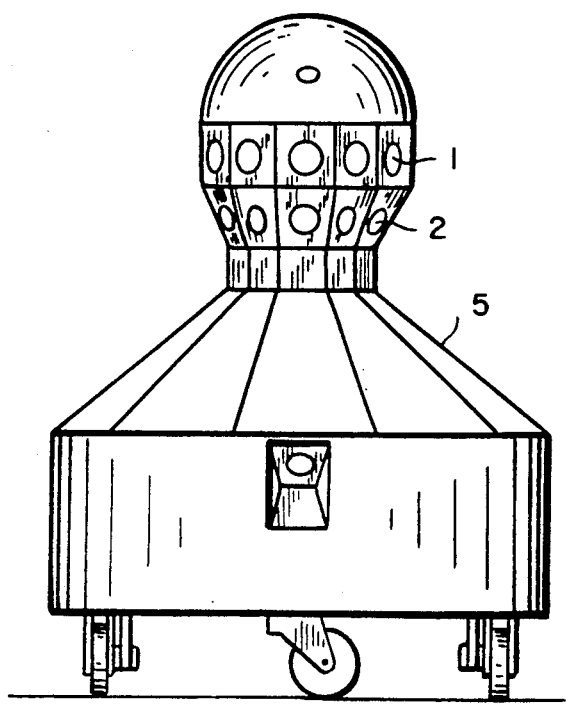
FIG. 1
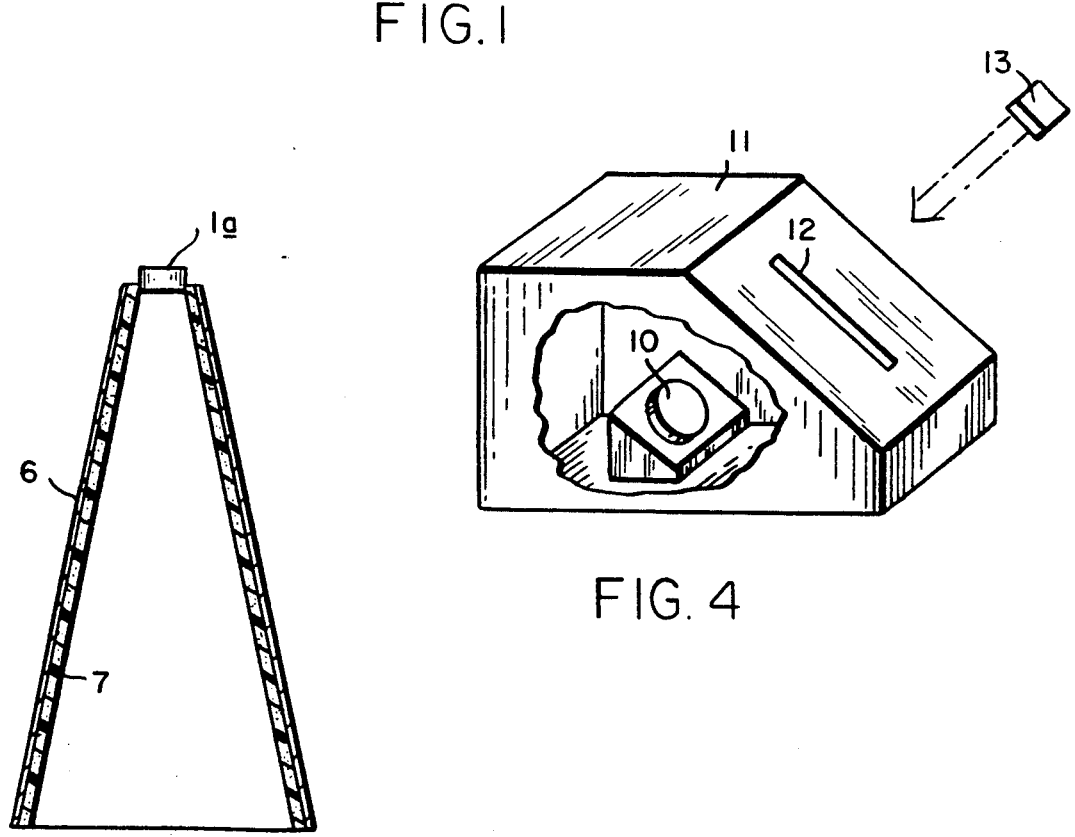
FIG. 3
FIG. 4

MOBILE ROBOT GUIDANCE AND NAVIGATION SYSTEM

BACKGROUND OF THE INVENTION

1. Field of the Invention

The present invention relates generally to a system for orienting and guiding a mobile robot. More particularly, the invention pertains to apparatus utilizing both ultrasonic and infrared sensors to derive data for a software process that enables the robot to "see" sufficiently well to navigate by itself while avoiding obstacles in its path.

2. Discussion of the Prior Art

In my U.S. Pat. No. 4,638,445, issued Jan. 20, 1987, whose entire disclosure is incorporated herein by reference thereto, there is described an autonomous mobile robot employing a vision system having two arrays of ultrasonic sensors for obtaining data on the position and distance of objects in the workspace. One of the sensor arrays is used principally to see near objects and the other array is used principally to see far objects. The two arrays, preferably, are symmetrically disposed about an axis that extends through the body of the robot. This enables the robot to see in all directions of the workspace without having to spin around to collect data, while enabling the robot to turn about its axis of symmetry should such motions be desired. By having the arrays symmetrically disposed about the axis of symmetry extending through the robot's body, a computer, carried on board the robot (and not shown in the drawing so as not to obfuscate the invention), is relieved of the task of having to manipulate the data to simulate that arrangement. In the arrangement described in my aforesaid patent, the sensors, preferably, are cyclically polled in a repetitive sequence; but the cycle or the sequence, or both, with some increase in software complexity, may be altered to deal with special situations. Data received from the sensors is stored and provides a continually updated representation of the space and objects seen by the sensors. A software program causes the computer to utilize the data provided by the sensors to control the robot so as to enable the robot to navigate by itself while avoiding collisions with obstacles in its path and enabling the robot to take a different path when required, to get around obstacles blocking its movement.

The invention disclosed herein enables the robot to navigate with greater precision than can be attained with the coarse resolution provided by the prior ultrasonic vision systems and enables the robot to utilize a higher rate of data acquisition by substantially reducing crosstalk between the transducers of the ultrasonic vision systems.

SUMMARY OF THE INVENTION

These objectives are achieved in a mobile robot which has a guidance and navigation system (sometimes called a "vision" system) employing one or more arrays of ultrasonic transducers and, preferably, one or more infrared detectors, as well. Each of the ultrasonic transducers is arranged to monitor its own sector of the robot's workspace. Sector monitoring is facilitated by providing for each such transducer a horn fronting the transducer. The horn flares at an angle related to the extent of the sector monitored by the transducer; and at least part of the horn's surface is covered by ultrasonic energy absorptive material. The horns significantly reduce crosstalk when a plurality of the transducers in the array simultaneously are activated.

As stated above, according to a second aspect of the invention, the robot is used in conjunction with an infrared beacon system including one or more (preferably ceiling mounted) beacons each of which emits a uniquely coded infrared signal. The robot is equipped with an infrared detection means affixed to the robot and arranged to allow light from the beacon to impinge on an infrared sensor only when the detector is in precise alignment with the beacon. Multiple sensors are preferably provided, each receiving light from the beacon only when that sensor is aligned with the beacon. The robot also has a decoder connected to the detection means, for decoding the signal from the infrared beacon so as to ascertain the particular beacon the robot is near, for determining the location of the robot. The orientation of the robot relative to the beacon is signalled by which sensor is aligned with the beacon, which is determined by the processor examining all sensor outputs and picking the one with the largest output signal.

The invention can be better understood from the detailed description below when it is considered in conjunction with the accompanying drawings.

BRIEF DESCRIPTION OF THE DRAWING

In the drawing,

FIG. 1 is an elevational view of my prior art autonomous mobile robot showing the arrays of ultrasonic transducers that are fixed to the robot to serve in the robot's vision system;

FIG. 3 diagrammatically depicts in cross section an embodiment of a horn for fronting each ultrasonic transducer of the invention for reducing crosstalk and improving the shape of the transmitted pulse by absorbing its side lobes;

FIG. 4 is an enlarged view diagrammatically showing an infrared detector for use herein, including an arrangement for housing the robot's infrared sensor to enable the sensor to respond to a beacon's emitted radiation only when the sensor is in precise alignment with the beacon.

DETAILED DESCRIPTION

Figure 2:
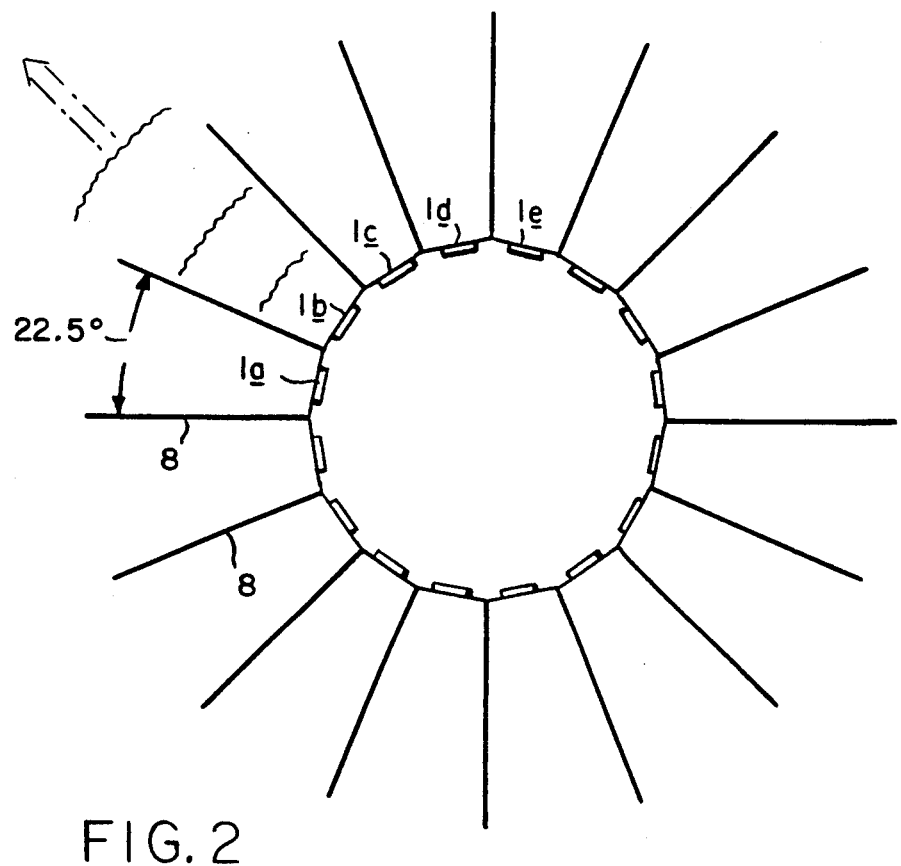
FIG. 2 is a plan view of an array of ultrasonic transducers according to the present invention, for use with a robot of the type shown in FIG. 1, the transducers being arranged to enable each transducer to monitor its own sector of the robot's workspace while reducing crosstalk when a group of the transducers are simultaneously activated.

Referring now to FIG. 1, my prototype prior art autonomous mobile robot 5 is shown, this robot being more fully described in my afore-cited patent. As illustrated, the prototype mobile robot carries two arrays of ultrasonic sensors (1 and 2) which are immovably fixed to the robot 5 and provide it with a vision system. Each array of sensors is comprised of a plurality of ultrasonic transducers of a type developed by the Polaroid Corporation specifically for use as a high speed, variable range, noise immune, distance measuring device. That type of transducer is described in detail in the paper titled, "The Polaroid Ultrasonic Ranging System,"

Number 1696 (A-8), presented at the 67th Convention of the Audio Engineering Society.

As described in the Polaroid paper, the sensor's electronic drive circuit allows the gain of the sensor, and therefore the threshold amplitude of an echo to be received, to be varied dynamically. The gain is defined as being equivalent to the sensitivity to an echo of the sensor and its circuitry.

In the operation of the robot's vision system, the gain variation is from low gain to high gain and the shift in gain is a cyclic event. The cycle is begun upon completion of the transmission of an ultrasonic pulse, and is terminated and reset at the transmission of the next pulse. As time passes, the gain of the sensor is increased to allow reception of pulses having lower and lower amplitudes. The purpose of this is to prevent low amplitude noise from being received as echoes from near range objects; since near range objects should reflect back a strong echo, low gain may be used. Ultrasonic pulses decrease in amplitude due to attenuation over distance so that an echo from a distant object requires a higher gain in order to be received. Therefore, the shift of gain will arise, due to noise, when the sensors are operating in the near range for collision avoidance.

While the shifting of a sensor's variable gain is handled automatically in the hardware, the software may choose to limit the time in which signals from a sensor are accepted. In this way, the sensor may be effectively manipulated to operate in the near range or far range simply by controlling the time interval in which data from a sensor is gathered. This is called "time domain shifting", where the "time domain" is the period between the transmission of a pulse and reception of an echo back from an object at some distance. The magnitude of the time period for a given distance is easily ascertained since the speed of sound in air is known. Therefore, the maximum distance from which echoes will be accepted may be selected by the software process, which, in effect, chooses the vision system range. At present, this dynamic adjustability allows the robot's vision system to perform adequately at distances and ranges up to approximately 35 feet.

In the FIG. 1 embodiment, the ultrasonic transducers are disposed in two symmetrical concentric arrays 1 and 2 around the entire perimeter of the robot. Each transducer of an array is arranged to monitor its own sector of the robot's workspace. This embodiment relies upon the ultrasonic transducer to transmit a pulse that covers the monitored sector. That arrangement allows the data produced to be structured in the most usable and compact manner possible. During a scanning cycle of the workspace, every transducer in the array is polled and the distance is measured to each object in the sensor's range which provides an echo of sufficient amplitude. This distance measurement is converted to a digital number that is used in the software process. The polling of a transducer involves initiating the transmission of an ultrasonic pulse into the monitored sector and then waiting for a predetermined time interval (the time interval being selected by the software) in which data produced by reception of echoes is gathered. At the end of that time interval, the software stops monitoring the polled sensor.

"Crosstalk" is the term used to denote echoes received by a transducer that are reflections of an ultrasonic pulse transmitted by some other transducer. Where each transducer in the array is activated one at a time, and enough time is allowed between transmitted pulses for the ultrasonic energy to dissipate before the next pulse is sent out, there is, of course, no crosstalk. That mode of polling the transducers avoids the problem of crosstalk but slows the acquisition rate of data down to the point where the robot must move slowly because the rate of updating the data is so low that an object can enter the workspace and the robot is apt to collide with it before the robot "sees" it.

In the prior art prototype embodiment, where the transmitted pulse overlapped an adjacent sector, crosstalk was avoided by activating the transducers in pairs of directly opposite transducers so that the two transmitted pulses radiated out in opposite directions. By that mode of polling, even where a transmitted pulse overlapped adjacent sectors, the sensors monitoring those sectors were unactivated and unable to respond to the echoes reaching them. Because of the side lobes and spread of the transmitted pulse, the transducers monitoring the adjacent sectors had to remain unactivated in the prototype embodiment to avoid the problem of crosstalk. Crosstalk, thus, placed a limit on the number of transducers that could be simultaneously activated and limited the rate of data acquisition.

Referring to FIG. 2, exemplary ultrasonic transducers $1a$, $1b$, $1c$, etc., of array 1 are disposed in a symmetrical array so that each transducer in the array covers its own sector of the workspace figuratively. In an embodiment of the robot that was built, each transducer was arranged to monitor a 22.5° sector, though that sector size is exemplary only. The transducer, when activated, emitted a 22.5° wide ultrasonic pulse and received the echoes of that pulse reflected within that narrow sector.

In the example of the array using transducers which monitor 22.5° sectors, an echo returning to an activated transducer from within its 22.5° sector denotes an object within the monitored zone. The transducer cannot tell whether the object reflecting the pulse is within a portion of the sector or extends across the entire 22.5° extend of the sector. That is, the resolution of the system is determined by the extent of the sector monitored by the transducer. Resolution can be improved by narrowing the angle monitored by the sensor to less than 22.5°, but to cover the entire 360° of the workspace, more sensors would then be needed. There is, of course, a limit to the number of sensors that can be crowded onto the robot, as well as a practical limit imposed by the cost of the transducers and their associated control apparatus. Where lower resolution can be tolerated, cost can be reduced by employing fewer sensors and arranging each sensor to monitor a wider sector.

The speed at which the robot can move safely is governed by the rate of data acquisition which, in turn, determines the rate at which the data is updated. The faster the rate at which data is acquired, the faster the robot can detect changes occurring within its range of vision, and, consequently, the faster the robot can move safely. One instance of where a faster data acquisition rate is desired is a situation where an object darts into the path of movement of the robot. To avoid a collision, the robot's rate of data acquisition must be fast enough to allow the robot to take timely action, by stopping, altering its path, reversing its direction of motion, or doing something else.

One way of increasing the data acquisition rate is to actuate simultaneously all the ultrasonic transducers in the array and to repeat the actuations with as small an interval as feasible between actuations. The limitations imposed on this mode of operation arise from crosstalk and from noise. The ultrasonic energy from the simultaneous activation of the transducers must be allowed to dissipate substantially before the transducers are again activated. If that is not done, the next ultrasonic pulse will be transmitted into a noisy environment and the transducer may not be able to distinguish a weak pulse echo from noise. By activating the sensors in groups whereby every transducer of the activated group is separated from the next adjacent activated sensor in the group by at least one unactivated transducer, crosstalk is reduced. Where 22.5° transducers are employed to see all around the robot, for example, it is preferred to arrange the transducers in two groups and alternately activate the groups.

Crosstalk, in accordance with the invention, is further reduced by having each transducer (or at least several) fronted by a horn whose surface is coated with an ultrasonic energy absorptive material. For example, as shown in FIG. 3, the exemplary transducer 1a is fronted by a horn 6 whose interior surface is coated with an ultrasonic energy absorptive material 7. (Any suitable ultrasonic energy absorptive material may be used; the invention is not limited to a specific material, and many are known.) At the interface of the horn with the energy absorptive material, ultrasonic energy is reflected so that ultrasonic energy penetrating the absorptive material and reaching the interface is reflected back into the absorptive coating. Where the ultrasonic transducer 1a, for example, generates a pulse to monitor a 22.5° sector, the horn flare is 22.5°. Thus, the transmitted pulse just grazes the absorptive material as it radiates out from the horn. That arrangement helps shape the transmitted pulse by absorbing the side lobes of the transmitted pulse before it leaves the horn. Any echoes originating from pulse energy transmitted by some other transducer(s) will tend to impinge on the horn and be absorbed before they can reach the monitoring transducer 1a. Instead of using a conical form, the horn 6, preferably, is made of flat plates arranged to form a truncated hollow pyramid having the transducer at the narrow end and an open base at the other end. In the arrangement illustrated in FIG. 2, the flat plates 8 act as horn sides and sector dividers between adjacent transducers. In that arrangement, both sides of the sector dividers are coated with ultrasonic energy absorptive material 7. The "top" and "bottom" plates needed to complete the horns are not shown, for simplicity.

Figure 5:
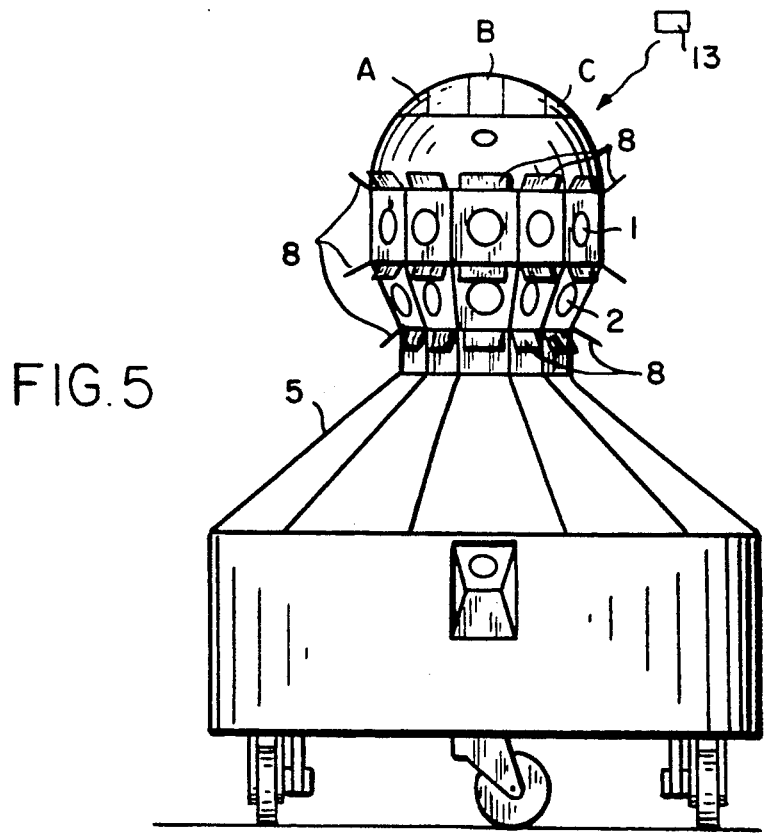
FIG. 5 is a diagrammatic illustration of a robot according to the invention, illustrating the possible placement and use of a plurality of infrared detectors of the type shown in FIG. 4.

In situations where the robot is required to ascertain its precise position in the workspace, as where the robot must move a precise distance after reaching a precise spot in the workspace and then make a turn into a corridor or through a doorway, an infrared beacon is also employed to provide a data checkpoint that enables the software to fix the location of the robot with a precision not attainable with the resolution provided by the ultrasonic vision system. The infrared beacon, preferably, is placed high up, adjacent to or on the ceiling of the space, where it is unobtrusive and out of the way. If more than one checkpoint is desired, a plurality of beacons may be employed. Preferably, the infrared beacon is a diode of the type producing infrared light which can be modulated to transmit a code that uniquely identifies the beacon in the event more than one beacon is used. One or more infrared detectors are mounted on the robot in a manner, and with means, enabling light from the beacon to reach the detector's sensor only when the detector is precisely aligned with the beacon. To that end, as diagrammatically shown in FIG. 4, each detector comprises an infrared sensor 10 housed in an enclosure 11 having a narrow slit or opening 12 through which light from the beacon 13 can pass to impinge on the sensor. Referring to FIG. 5, to better orient the robot, two or more detectors (e.g., A, B and C) may be employed, each containing a sensor placed in a housing 11A and 11B which admits light coming only from a specific direction (e.g., from the right, left, directly in front, or directly behind the robot). Using a map of its environment which is stored in the computer's memory, the robot can thus ascertain its direction of movement and orientation relative to the beacons.

The beacon may also be modulated to transmit a command to the robot, in addition to transmitting its own identifying code. For example, the beacon may define the limit of the workspace to which the robot is confined. When the robot approaches the limit, the beacon's command may require the robot to reverse its direction of motion, to stop, or to take some other action.

It is important to note that the drawings are not drawn to scale, are normative only, and that dimensions and distances in the figures are not to be considered significant. Further, it is intended that the invention not be limited to the precise embodiment disclosed herein which is exemplary only, but rather that the scope of the invention be construed in accordance with the appended claims and equivalents thereto.

What is claimed is:

1. In a mobile robot of the type having
   a. a vision system employing at least one array of ultrasonic transducers in which each transducer is arranged to monitor its own sector of the robot's workspace;
   b. means for simultaneously activating a plurality of the transducers in the array whereby each activated transducer transmits a pulse of ultrasonic energy, the improvement for reducing crosstalk comprising
      i. a horn fronting each activated transducer, the horn flaring at an angle related to the extent of the sector monitored by the transducer; and
      ii. ultrasonic energy absorptive material covering at least part of each horn's surface.

2. In a mobile robot of the type having
   a. a vision system employing at least one array of ultrasonic transducers in which each transducer is arranged to monitor its own sector of the robot's workspace;
   b. means carried on the robot for enabling the robot to utilize data provided by the ultrasonic vision system for autonomous navigation within the workspace, the improvement for enabling the robot to ascertain its precise location in the workspace, comprising,
      i. at least one infrared beacon situated in a known location in the workspace; and
      ii. at least one infrared detection means affixed to the robot, including an infrared sensor and means limiting the direction from which light can reach the sensor from a beacon; and
      iii. a horn having an inner surface coated in part by ultrasonic energy absorptive materials fronts each of said transducers.

3. The robot of claim 2 wherein each beacon emits infrared light modulated by a code unique to the beacon's location and the robot further includes means coupled to the sensors for decoding the modulation of the received infrared signal to determine the location of the robot.

4. The robot of claim 3 means for determining which of a plurality of sensors is receiving the light from the beacon, when a plurality of sensors are employed, for determining the orientation of the robot relative to the beacon.

5. The robot of claim 2 including a fixed array of infrared detection means.

6. A mobile robot comprising:
   a. a vision system employing at least one array of ultrasonic transducers in which each transducer is arranged to monitor its own sector of the robot's workspace;
   b. means for simultaneously activating a plurality of the transducers in the array; and
   c. a horn fronting each activated transducer, the horn flaring outwardly from the transducer at a rate related to the extent of the sector monitored by the transducer.

7. The mobile robot according to claim 6 further including an ultrasonic energy absorptive material covering at least part of each horn's interior surface.

8. A mobile robot guidance system comprising:
   a. a beacon system having at least one information-transmitting beacon providing information concerning the workspace; and
   b. a robot having
      1. a vision system employing at least one array of ultrasonic transducers in which each transducer is arranged to monitor an associated sector of the robot's workspace,
      2. means carried on the robot for enabling the robot to utilize data provided by the ultrasonic vision system for autonomous navigation within the workspace, and
      3. means carried on the robot, for receiving the information from said beacon and making a decision based on the information.

* * * * *